UNITED STATES PATENT OFFICE.

LUDWIG BEREND, OF AMÖNEBURG-ON-THE-RHINE, GERMANY.

PROCESS FOR MAKING CONDENSATION PRODUCTS FROM PHENOLS AND FORMALDEHYDE.

1,191,390.  Specification of Letters Patent.  Patented July 18, 1916.

No Drawing.  Application filed December 8, 1913. Serial No. 805,365.

*To all whom it may concern:*

Be it known that I, LUDWIG BEREND, chemist, citizen of Germany, subject of the King of Prussia and Emperor of Germany, residing at Landgrabenweg 14, Amöneburg-on-the-Rhine, in the Kingdom of Prussia and Empire of Germany, have invented new and useful Improvements in Processes for Making Condensation Products from Phenols and Formaldehyde, of which the following is a specification.

The present invention relates to a process for making condensation products soluble in fatty oils from phenols and formaldehyde and essentially consists in adding an agent transmitting dissolving qualities or acting as an intermediary for producing solution to the still fusible and still soluble phenol resins, which agent is soluble both in the obtained condensation products and in the fatty oils. As such agents transmitting dissolving qualities for the present purposes resins and resin compounds of all kinds, resin esters, resin acids and their salts, the so called resinates and others are suited. The use of agents transmitting dissolving qualities in itself is already known in so far as for instance alcohol is used in order to render essential oils soluble in water; but in this case the solubility obtained between the heterogeneous components, oil and water, is a very limited one. Moreover the conditions are, considerably different in so far as the intermediary agent alcohol is a solvent as well for essential oils as also for water, whereas the solid resins cannot be considered as solvents for the condensation products from phenols and formaldehyde, and still less as a solvent for oils. On the contrary only the oils can be considered as solvents for resins. Moreover the effect here obtained in so far considerably surpasses that obtained by the mentioned addition of alcohol, as the solubility of the produced resins in fatty oils is an unlimited one.

It has been proposed to also produce resins which under certain conditions are soluble in oils by the condensation of phenols with formaldehyde when using tars of various kinds, balsams and resins as a catalytic medium. But I have further found, that this is only possible when such natural resins, balsams or similar materials are used, which are soluble as well in the formed phenol resins as in fatty oils, and when such quantities of these materials are employed which exceed the quantity required for the catalytic medium. If, for instance, a resin is employed in only so small a quantity as is usual for a catalytic medium for starting a reaction, such as for example a quantity of about 5% of the employed phenol, a product will be obtained which will indeed be soluble during the initial part of the reaction, which, however, becomes insoluble in oils on being further heated. It had, thus, hitherto not been recognized what part the added resins and the like play, and that by their action as a catalytic medium the solubility of the obtained products in oil is not secured. Neither has the production of resins soluble in oil by other means been hitherto mentioned, and it could not be expected, that the phenol-aldehyde-resins hitherto known, which are all insoluble in fatty and essential oils, would become soluble in oil by being melted together with oil-soluble resins and similar substances. By this eminent technical effect it will now be possible, to employ the extremely hard, strong and highly antiseptic phenol-formaldehyde-resins in a very wide manner, what was heretofore impossible, as now they can easily be worked into varnishes of all kinds. The oil-soluble resins obtained are also soluble in oil of turpentine, benzol, benzin and a number of other known solvents, particularly when they had been previously introduced into the fatty oils.

At the same time the present process allows of rendering harmless the remainder of phenol tenaciously adhering to the fusible and soluble phenol aldehyde resins by converting them by heating during some time with resin acids into the respective odorless esters, which are likewise readily soluble in oil.

The agents acting as an intermediary for producing solution are chosen according to the desired purpose; also mixtures of the various resins, balsams, terpene compounds, waxes, fatty oils and the like may be used in this sense. Preferably the resins or the like required for producing the solubility of the products to be obtained are introduced directly into the reaction mixtures, so that they are acting on the one hand as catalytic media and on the other as intermediaries for producing solution. They may, however, also be fused together with the different intermediate products of reaction and be then further heated with them, so as to remove volatile parts, if any. On the other hand also the finished phenol-aldehyde-resins may be fused together with the agents acting as an intermediary for producing solution.

I have further found that soluble and fusible phenol-formaldehyde-resins, and preferably such, which have already become oil-soluble by the present process, are excellent solvents for copals and that said copals are thereby likewise made readily soluble in oil, without their being previously melted out, as hitherto necessary, and freed of the volatile acid copal oils, so that they could be made up in fatty oils to varnishes.

As phenols for the production of the phenol-resins all phenols in the farthest sense can be used; so also cresols, naphthols, and their derivates, their halogen compounds, their carboxylic acids and the like may be used for producing the phenol resins, and in place of the formaldehyde its polymeres, trioxymethylene, hexamethylenetetramin and other aldehydes may be employed.

*Examples.*

1. 100 grams of pure carbolic acid of commerce and 100 grams turpentine resin are heated for 6 hours with 30 grams trioxymethylene in a vessel with a return condenser to a temperature of 115 to 120° cent. The temperature is then, while the mixture is being stirred, gradually raised to 200° cent., provision being made, that the volatile parts are removed from the produced resin. The resulting resin has a slight yellow color and melts at a temperature of 160 to 185° cent. It dissolves on being heated in linseed oil and the thus obtained varnish extract may be thinned to any desired extent by means of oil of turpentine, benzin or benzol, a clear solution being formed thereby.

2. 108 grams of crude cresol are condensed in a vessel with a return condenser with 29 grams of trioxymethylene for 3 hours at a temperature of 115° cent. Then 60 grams of colophonium are added to the still soft resin melt and the mass is condensed further for 4 hours. Lastly the return condenser is removed, and the mass is heated, while stirring, for 2 hours to 210° cent. until all volatile parts and the water have been removed as far as possible. A yellowish resin is obtained, melting at 155 to 195° cent. and soluble as that obtained by Example 1.

3. 95 grams of pure carbolic acid (commercial) are heated for three hours in a vessel with a return condenser with 70 grams of formaldehyde of 40 weight percents and with 0.2 gram of hydrochloric acid to a temperature of 110–112° cent. To the reaction mixture are then added 30 grams of Manila copal and the whole is then condensed further for six hours. After the water has been removed, the resin mixture obtained is freed in 2 hours at a temperature of 210° cent. of the volatile components, and will then melt at 135–165° cent. The solubility is the same as that of resin No. 1 and 2, but more easily in linseed oil.

4. 108 grams of cresol, 30 grams of turpentine resin and 28 grams of paraformaldehyde are heated for 6 hours at 115 to 120° cent. To the thus obtained yellow resin 50 grams of kauri-resin are added in small pieces and the whole is then heated, while stirring and removing the volatile parts and the water, for two hours at a temperature of 250° cent. The resin obtained fully equals melted out kauri-resin, melts at 160–205° cent., and has the same solubility as fossil copals.

Having now described my invention what I claim and desire to secure by Letters Patent of the United States is:

1. The process of making phenol-formaldehyde resins soluble in oil, which consists in combining in a molten state the phenol-formaldehyde resins with natural resins until the mass thus obtained has become soluble in fatty oils and oil of turpentine.

2. The process of making phenol-formaldehyde resins easily soluble in oil consisting in treating the condensation products of a phenol with formaldehyde and with agents which are soluble both in the produced phenol-formaldehyde-resins and in fatty oils until the mass thus obtained has become fairly soluble in fatty oils.

3. The process of making phenol-formaldehyde resins soluble in oil consisting in phenol-formaldehyde resins being molten together with natural resins during so long a period that the mass obtained thereby will easily dissolve in fatty oils.

4. The process of producing phenol-formaldehyde resins consisting in condensing phenol with a formaldehyde substance and melting the thus obtained condensation product with a natural resin in such a quantity and during such a period that the mass obtained thereby will easily dissolve in fatty oils.

5. The process of making phenol-formaldehyde resins soluble in oil consisting in the phenol-formaldehyde resins being fused together with fossil natural resins.

6. The process of making phenol-formaldehyde resins soluble in oil consisting in fusing together the phenol-formaldehyde resins with copal.

7. The process of making phenol-formaldehyde resins soluble in oil consisting in treating the condensation products of a phenol with formaldehyde and with agents which are soluble both in the produced phenol-formaldehyde-resins and in fatty oils, the oil soluble phenol-formaldehyde resins thus obtained being fused together with copal.

8. The process of producing oil solutions of phenol-formaldehyde resins consisting in condensing a phenol with a formaldehyde-substance and adding an agent which is soluble both in phenol-formaldehyde resins and in fatty oils and dissolving the product thus obtained in a fatty oil.

In testimony whereof I have hereunto set my hand in presence of two subscribing witnesses.

LUDWIG BEREND.

Witnesses:
  MORITZ WETZEL,
  MARIA HAHN.